United States Patent [19]

Zengaffinen et al.

[11] Patent Number: 4,473,175

[45] Date of Patent: Sep. 25, 1984

[54] DEVICE FOR ACCURATELY CONTROLLED FEEDING OF A FINE-GRAINED, FREE-RUNNING PARTICULATE MATERIAL

[75] Inventors: Josef Zengaffinen, Steg; Erwin Arnold, Venthône, both of Switzerland

[73] Assignee: Swiss Aluminium Ltd., Chippis, Switzerland

[21] Appl. No.: 349,040

[22] Filed: Feb. 16, 1982

[30] Foreign Application Priority Data

Feb. 27, 1981 [CH] Switzerland ............... 1329/81

[51] Int. Cl.³ .............................. G01F 11/28
[52] U.S. Cl. ................... 222/452; 222/556
[58] Field of Search ........... 222/452, 450, 451, 519, 222/544, 556

[56] References Cited

U.S. PATENT DOCUMENTS

| | | | |
|---|---|---|---|
| 742,969 | 11/1903 | Clapp | 222/452 |
| 2,059,135 | 10/1936 | Moe | 222/452 |
| 3,365,240 | 1/1968 | Gordon | 222/450 |

FOREIGN PATENT DOCUMENTS

| | | | |
|---|---|---|---|
| 164650 | 9/1958 | Denmark | 222/450 |
| 2654137 | 1/1978 | Fed. Rep. of Germany | 222/452 |
| 281507 | 11/1971 | U.S.S.R. | 222/452 |

Primary Examiner—Joseph J. Rolla
Assistant Examiner—Kenneth Noland
Attorney, Agent, or Firm—Bachman and LaPointe

[57] ABSTRACT

A device for accurately controlled feeding of a fine-grained, free-running particulate material from a silo into a reactor vessel, in particular alumina from a day's supply silo to a break in the crust on an aluminium fused salt electrolytic cell, comprises essentially a vertical feed pipe which is situated below the silo and features upper and a lower closing flaps both of which are in the form of segments of a cylinder. The feed pipe mounted on the funnel shaped lower part of the silo features an outlet funnel which joins up with an outlet pipe.

15 Claims, 2 Drawing Figures

DEVICE FOR ACCURATELY CONTROLLED FEEDING OF A FINE-GRAINED, FREE-RUNNING PARTICULATE MATERIAL

BACKGROUND OF THE INVENTION

The invention relates to a device for accurately controlled feeding of a fine-grained, free-running material from a storage silo into a reactor vessel, in particular alumina from a day's storage silo to a break in the crust on an aluminum fused salt electrolytic cell.

The production of aluminum by fused salt electrolysis of aluminum oxide involves the dissolution of the latter in a fluoride melt which is comprised for the greater part of cryolite. The cathodically deposited aluminum collects under the fluoride melt on the floor of the cell, the surface of the liquid aluminum itself forming the actual cathode. Dipping into the molten electrolyte from above are anodes which in conventional processes are made of amorphous carbon. At the carbon anodes oxygen is formed as a result of the electrolytic decomposition of the aluminum oxide; this oxygen reacts with the carbon of the anodes and forms $CO_2$ and $CO$. The electrolytic process takes place in a temperature range of approx. 940°–970° C.

In the course of the electrolytic process the electrolyte becomes depleted of aluminum oxide. At a lower concentration of 1–2 wt% aluminum oxide in the electrolyte the anode effect occurs whereupon the voltage rises for example from 4–5 V to 30 V or more. Then at the latest the aluminum oxide concentration must be raised by adding fresh alumina to the cell.

Under normal operating conditions the cell is generally fed alumina at regular intervals even when no anode effect occurs. In addition, whenever the anode effect occurs, the alumina concentration must be raised by adding fresh aluminum oxide, which constitutes a servicing of the cell.

For many years now servicing the cell has included breaking the crust of solidified melt between the anodes and the sidewall of the cell and then adding aluminum oxide there. This method, which is still widely practiced today, is meeting with increasing criticism due to pollution of the air in the pot room and surrounding areas. The demand for hooding of the pots and treatment of the waste gases has increasingly become an obligatory requirement in recent years. Maximum capture of the pot gases is not possible with hooding if the classical method of feeding the cells at the long side between the anodes and the sidewall of the cells is maintained.

More recently, therefore, the aluminum producers have gone over increasingly to automatic feeding of the cell at its central longitudinal axis. The alumina is then fed either locally and continuously by so called point-feeding, or discontinuously along the whole longitudinal aixs of the cell. In both cases a storage bunker or silo for alumina is positioned on the cell. This applies to the inventors' recently proposed transverse feeding of electrolytic cells (DE-OS No. 27 31 908).

The known storage bunkers or alumina silos on the electrolytic cells are in the form of funnels or containers with funnel shaped lower parts. The contents of the silos on the cells usually suffice for one to two days feeding of the cell. The feeding of the alumina in the silo to a hole in the crust covering the molten electrolyte is, in the case of these known devices, carried out by means of an apportioning, sliding feed facility, a controlled feed screw and compressed air, a controlled feed screw and a piston compressor, a jacking and/or rotating valve device or by the sprinker method. Also known is the method of feeding alumina by gravity feeders and fluidizing channels.

Numerous, known controlled feeding devices sufffer the disadvantage that they are susceptible to breaking down and/or operate with insufficient precision.

It is therefore an object of the invention to develop a reliable and economically operable controlled feed device for supplying fine-grained, free-running particulate materials, said device being characterized by way of its high accuracy of feeding.

SUMMARY OF THE INVENTION

The object is achieved by way of the invention, characterized by way of:

a vertical feed pipe which is secured to the funnel shaped lower part of the silo and features an outlet funnel which joins up with a lower outlet pipe, whereby the silo outlet funnel which joins up to an outlet projects into the feed pipe as a self-contained element, one upper and one lower cylinder-segment shaped flap, which can be tilted from the horizontal into the vertical position and vice versa around horizontal axles penetrating the outlet pipe from the silo and the outlet pipe of the feed pipe, and such that the flaps, when in the horizontal position, are only a short distance from the lower edge of the respective outlet pipe, and the edge of the upper flap in that same position lies, in the vertical direction, at least the same distance above the lower edge of the silo outlet pipe, and the tiltable horizontal axles are provided with drive facilities outside the feed pipe.

BRIEF DESCRIPTION OF THE DRAWINGS

The invention is explained in greater detail in the following with the aid of schematic drawings showing partially sectioned views.

DETAILED DESCRIPTION

Figure 1:
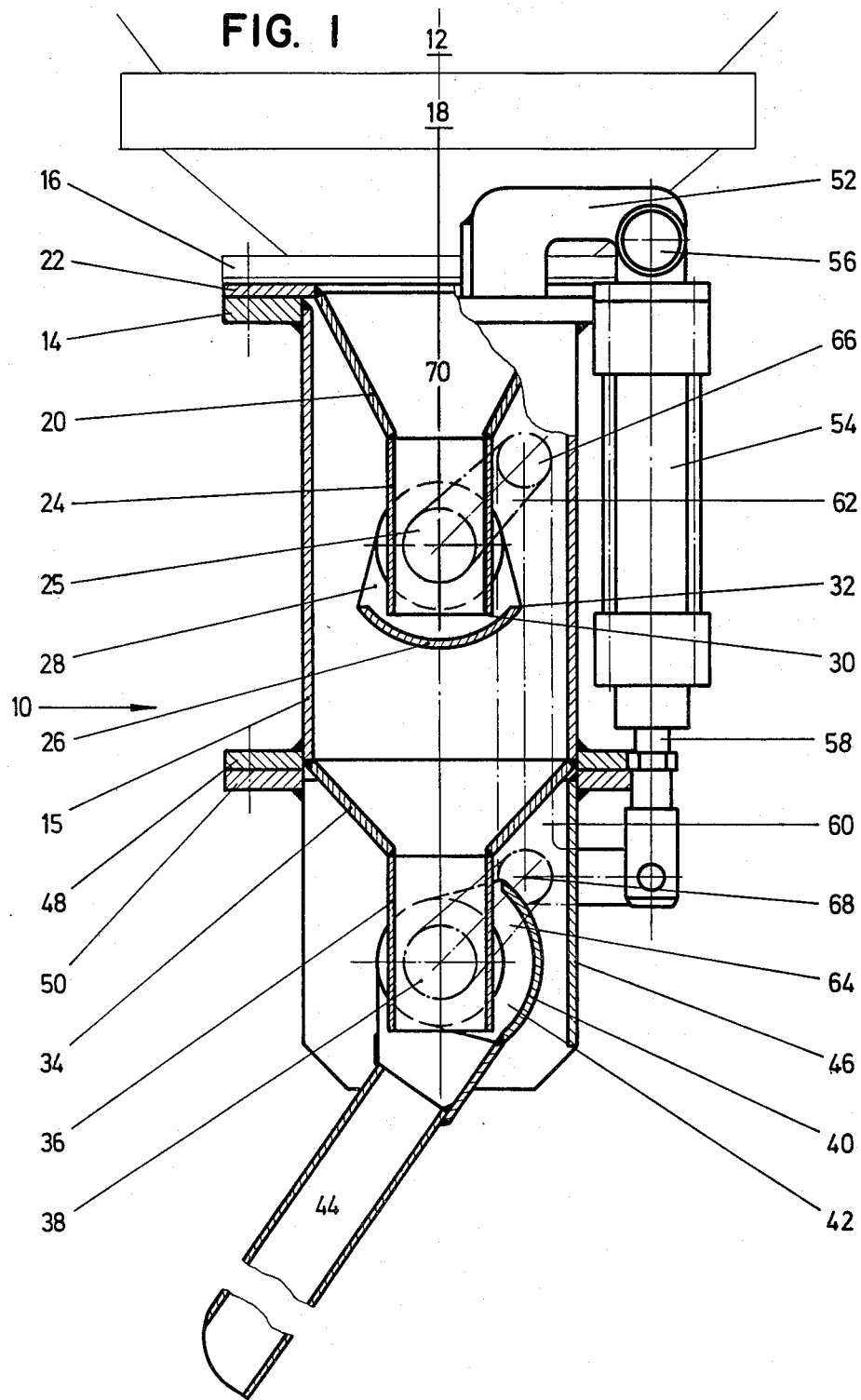
FIG. 1 represents a controlled feed device with upper and lower flaps which are linked directly together, here in the non-operative position.

The controlled feed device is usefully releasably flanged onto the funnel shaped lower part of the silo. If the device has to be replaced or removed, a slide plate positioned at a higher point can be closed and the flange bolts removed. This permits, within the shortest possible time, the mounting of a new device, which also includes the bearing of the horizontal axles and the drive mechanism. After a new unit has been fitted, the slide plate is again opened fully.

Both the upper and lower flaps are in the form of segments of a hollow cylinder, and the horizontal axles in the outlet pipes about which they can be moved are positioned where the longitudinal axis of the complete cylinder would lie.

Both open ends of the flaps are closed off by struts connecting up to the horizontal axles so that the flaps form a kind of trough. The dimensions of the flaps are such that, when in the horizontal position, the free ends of the flaps project above the level of the lower edges of the outlet pipes and the cone of particulate material on the flap effectively seals off the container above that flap.

The feed pipe and funnels are preferably circular in horizontal cross section, likewise the outlet pipes the lengths of which are usefully longer than the diameter; the horizontal axles penetrate the outlet pipes in their lower tubes. If the flaps in the horizontal position are little removed from the lower edge of the respective pipes, preferably 0.5–5 mm, then the flaps can be tilted into a vertical position by means of a drive mechanism without hindrance from a funnel. Of course the feed pipe must be of such a cross section that this tilting movement is not hindered. The bearing and the drive mechanism for the horizontal axles are situated outside the feed pipe.

When the lower flap is open, the alumina flowing out of the feed pipe falls freely into the region of the break in the crust. If the alumina is to be introduced closer to the break in the crust, one side of the lower flap has a run-out pipe connected to it which preferably lies approximately tangential to the flap. This run-out pipe points downwards at an inclined angle when the lower flap is open; when the flap is closed on the other hand it is swung upwards above the horizontal.

In the inoperative position the feed pipe is always empty i.e. the upper flap is closed. In feed pipes which stand full for a period of time the particulate material would settle under the action of vibration or other movements and become a dense mass. In the aluminum reduction cell the operation of crust breaking chisels would in particular have a disadvantageous effect. The densification of the material would lead to inaccurate changes which, in the case of the device according to the invention which works under correct handling with an accuracy of 1%, would be particularly disadvantageous.

In the filling position the upper flap is open and the lower flap closed. The particulate material flows through the silo outlet pipe until the cone of material has reached the lower edge of the pipe. Immediately after reaching that level, the device is brought into the discharging position in which the particulate material flows out of the feed pipe.

If the upper and lower flaps are rotated at the same time, then there is briefly an intermediate position in which alumina can flow simultaneously from the silo outlet pipe and the feed pipe outlet. Surprisingly, it has been found that this has hardly any noticeable effect on the precision of the amounts fed with each discharge of the device.

If the drive machanism for the horizontal axles can be tilted independently of each other, then the lower flap can also be left in the closed position when the device is not being operated. This has the advantage that during the longer non-operative interval no cell fumes can enter the feed pipe. Furthermore, when changing anodes, a run-out pipe which if desired is connected to the lower flap, can be raised and thus removed from the dangerous region of the anode body without the feeding device being filled.

On filling the feed pipe by means of independent drive mechanisms only the upper flap needs to be opened. Before the emptying, which follows immediately, the upper flap is closed again. The lower flap is opened and, after emptying out the charge, closed again.

When both horizontal axles are actuated by one single drive mechanism, the lower flap is always open when the device is in the non-operative position. If a run-out pipe is to be raised during a change of anodes, then the feeding device goes automatically into the filling position i.e. the lower flap is closed, the upper flap opened. Because of the vibration during the change of anode this charge is compressed and is therefore less accurate. In view of the large number of accurately controlled charges fed to the cell between anode changes, however, a single inaccurate charge is not important and can be neglected.

Specifically referring to the drawings, an exchangeable controlled feed device 10 is releasably attached to the funnel shaped part 12 of a silo of free running material, and features an upper flange 14 of feed pipe 15 bolted to a lower flange 16 of the silo. On replacing or removing device 10 the slide plate 18 which is otherwise always open, can be closed.

The functionally lowest part or silo outlet 20 of the silo is mounted in the feed pipe 15 as a self-contained element and is supported by a tightly clamped flange 22 in such a way that it is locked onto the funnel shaped part 12 of the silo. Just below the middle of the outlet pipe 24 is a tiltable horizontal axle 25 which is rigidly connected to the upper flap 26 via two facing struts 28.

In the non-operative positions the upper flap 26 is in the horizontal position and its distance from the lower edge 30 of the outlet pipe 24 is 1 mm. The edges 32 of the upper flap 26 project, with respect to the vertical direction, approximately 5 mm beyond the lower edge 30 of the outlet pipe 24. The static pressure and flow characteristics of the silo contents are not sufficient to allow the material to flow over the edges 32 of the flap, so that the silo is in fact tightly sealed.

The lowest part of the feed pipe 15 tapers down in the shape of a funnel 34 and joins up with the outlet 36. In this outlet 36, likewise just below the center, is the tiltable horizontal axle 38 for the lower flap 40 which is in turn rigidly joined to the axle 38 via two facing struts 42. An approximately tangential run-out pipe 44 is joined to the flap 40 and axle 38. On turning the horizontal axis 38 the run-out pipe 44 tilts along with it.

Mounted on a flange 48 on the lowest part of pipe 15 and held in place by flange 50 is a housing 46 for the lower flap 40; this housing 46 features a vertical slit to allow the tiltable run-out pipe 44 freedom of movement there.

Attached to the upper flange 14 of feed pipe 15 is a bracket 52 to support the pressure cylinder 54. The bracket 52 and the cylinder 54 are connected via a rigid axle 56. The piston rod 58 projecting out of the cylinder 54 can be actuated pneumatically or hydraulically. It is connected up, outside the feed cylinder, to the upper flap lever 62 and the lower flap lever 64 via a rigid L-shaped elbow lever 60. The flap levers are in turn rigidly attached to the horizontal axles 25 and 38. When the L-shaped elbow lever 60 is moved, the flap levers 62, 64 are made to pivot via an upper axle 66 and lower axle 68, resp.

Figure 2:
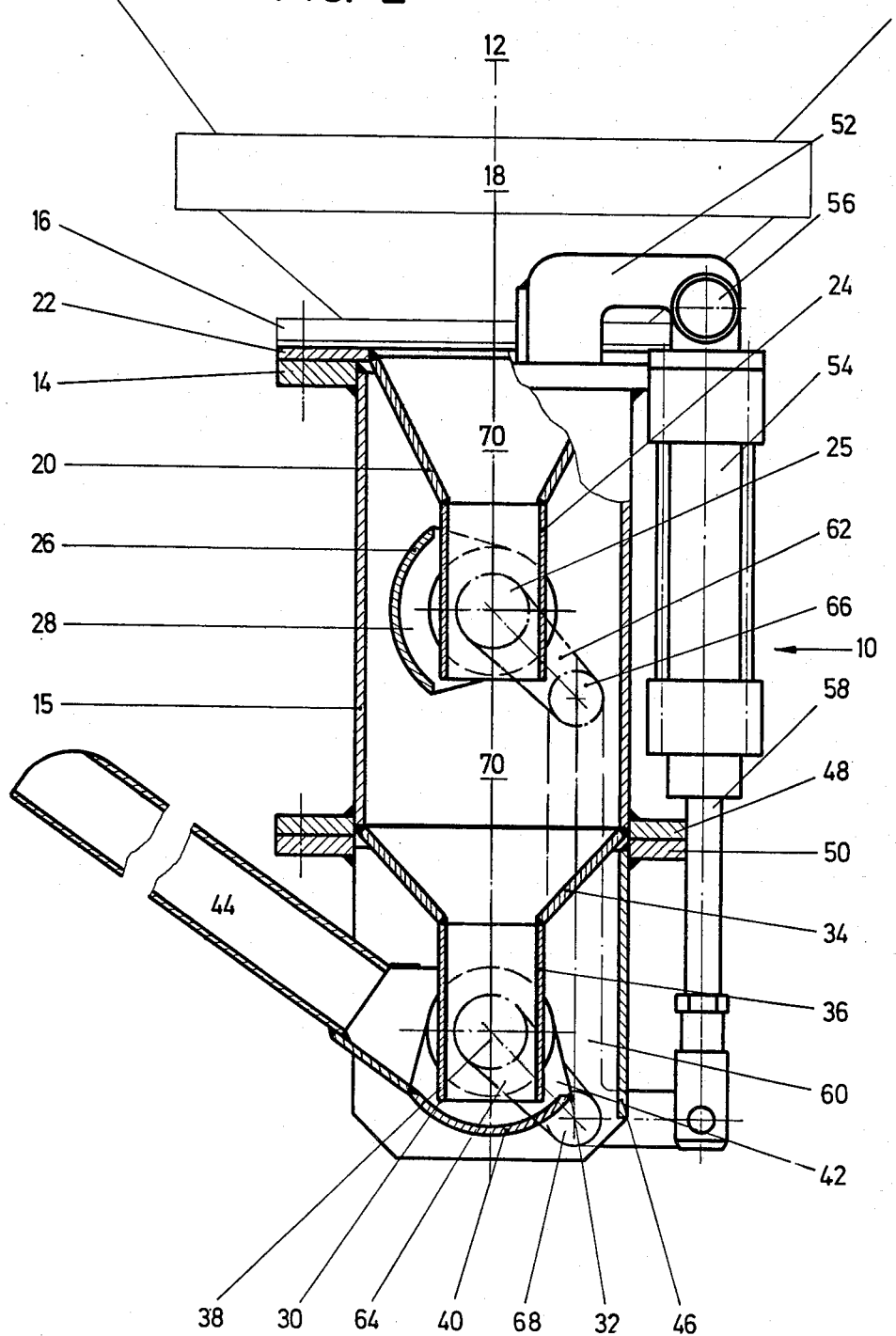
FIG. 2 represents a controlled feed device as in FIG. 1, here in the filled position.

In FIG. 2 the piston rod 58 has been lowered and has taken the L-shaped elbow lever 60 with it. The flap levers 62, 64 have caused the upper flap 26 and the lower flap 40 to rotate at the same time. The lower flap 40 closes off the outlet 36. The upper flap 26 which has been brought into the vertical position at the same time, unblocks the opening in the outlet pipe 24. The alumina 70 is then able to flow into the feed pipe 15 until the cone of material reaches the lower edge 30 of outlet pipe 24. Shortly after that the flaps are again brought into the non-operative position by raising the piston rod 58; the alumina 70 is then able to flow out through the likewise downward tilted run-out pipe 44.

What is claimed is:

1. Device for accurately controlled feeding of a fine-grained, free-running particulate material from a silo which comprises: a silo outlet; a vertical feed pipe which is secured to the silo outlet including outlet means communicating with said silo projecting into said vertical feed pipe and having lower edges thereof, wherein said vertical feed pipe includes a lower outlet funnel beneath said outlet means which joins up with a lower outlet pipe having lower edges thereof; one upper and one lower cyliner-segment shaped flap means each having edges thereof movable from the horizontal into the vertical position and from the vertical into the horizontal position, said upper flap means being operatively associated with said outlet means, and said lower flap means being operatively associated with said lower outlet pipe, wherein when said flap means are in the horizontal position they are in close, non-contacting relationship with respect to said associated lower edges of said outlet means and said lower outlet funnel and are operative to block their respective associated outlets and the edges of the flap means are spaced from and projected beyond and above said associated lower edges, and when in the vertical position to free their respective outlets; and means outside said feed pipe for controlling the movement of said flap means, wherein the lower edges of said outlet means define a horizontal plane and while the upper flap is in the horizontal position the edges of the upper flap lie at the level or above the level of the horizontal plane.

2. Device according to claim 1 wherein when said upper flap means are in the horizontal position, said lower flap means are in the vertical position, and when said upper flap means are in the vertical position, said lower flap means are in the horizontal position.

3. Device according to claim 1 for feeding alumina from a silo to a break in the crust on an aluminum fused salt electrolytic cell.

4. Device according to claim 1 including a funnel shaped lower part of a silo wherein said vertical feed pipe is secured to the funnel shaped lower part of a silo.

5. Device according to claim 4 wherein said silo outlet joins up to said outlet means which projects into the feed pipe as a self-contained element.

6. Device according to claim 1 wherein said flap means movable around horizontal axles.

7. Device according to claim 5 wherein an upper horizontal axle engages said outlet means, and a lower horizontal axle engages said lower outlet pipe.

8. Device according to claim 7 in which the upper flap is connected rigidly to the upper horizontal axle by means of two facing struts with one at each side, and the lower flap is connected rigidly to the lower horizontal axle by means of two facing struts with one at each side.

9. Device according to claim 8 wherein the connecting struts close off the sides of the flaps.

10. Device according to claim 7 wherein said flaps in the horizontal positions are from 0.5 to 5 mm from said associated lower edges.

11. Device according to claim 6 wherein the horizontal axles for moving the flaps are connected via levers to a connecting rod which can be actuated by a common drive mechanism.

12. Device according to claim 11 wherein the common drive mechanism is a pneumatically or hydraulically powered pressure cylinder with piston rod.

13. Device according to claim 1 wherein the lower flap is fitted with a run-out pipe on one side, lying approximately tangential to the flap and tiltable with the flap.

14. Device according to claim 1 wherein the lower flap is surrounded by a protective housing flanged onto the feed pipe.

15. Device for accurately controlled feeding of a fine-grained, free-running particulate material from a silo which comprises: a silo outlet; a vertical feed pipe which is secured to the silo outlet including outlet means communicating with said silo projecting into said vertical feed pipe and having lower edges thereof, wherein said vertical feed pipe includes a lower outlet funnel beneath said outlet means which joins up with a lower outlet pipe having lower edges thereof; one upper and one lower cylinder-segment shaped flap means each having edges thereof movable around horizontal axles from the horizontal into the vertical position and from the vertical into the horizontal position, said upper flap means being operatively associated with said outlet means, and said lower flap means being operatively associated with said lower outlet pipe, with the upper horizontal axle engaging said outlet means and the lower horizontal axle engaging said lower outlet pipe, wherein when said flap means are in the horizontal position they are in close, non-contacting relationship with respect to said associated lower edges of said outlet means and said lower outlet funnel and are operative to block their respective associated outlets and the edges of the flap means are spaced from and project beyond and above said associated lower edges and when in the vertical position to free their respective outlets; and means outside said feed pipe for controlling the movement of said flap means, wherein the lengths of the outlet means and lower outlet pipe are greater than their diameters, and the horizontal axles are situated at a level below the midpoints thereof.

* * * * *

UNITED STATES PATENT AND TRADEMARK OFFICE
CERTIFICATE OF CORRECTION

PATENT NO. : 4,473,175
DATED : September 25, 1984
INVENTOR(S) : Josef Zengaffinen et al.

It is certified that error appears in the above-identified patent and that said Letters Patent are hereby corrected as shown below:

Column 1, line 57, change "aixs" to read ---axis---.

Column 3, line 55, after "longer" insert ---,---.

Column 5, line 14, claim 1, change "cyliner-segment" to read ---cylinder-segment---.

Column 5, line 26, claim 1, change "projected" to read ---project---.

Column 5, line 49, claim 6, after "means" insert ---are---.

Column 5, line 50, claim 7, change "claim 5" to read ---claim 6---.

Signed and Sealed this

Twelfth Day of March 1985

[SEAL]

Attest:

DONALD J. QUIGG

Attesting Officer     Acting Commissioner of Patents and Trademarks